United States Patent
Goelff et al.

(10) Patent No.: US 9,862,615 B2
(45) Date of Patent: Jan. 9, 2018

(54) ALKALINE SILICATE DEHYDRATION

(75) Inventors: Pierre Goelff, Jumet (BE); Eric Jordan, Jumet (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 504 days.

(21) Appl. No.: 13/129,274

(22) PCT Filed: Nov. 17, 2009

(86) PCT No.: PCT/EP2009/065273
§ 371 (c)(1),
(2), (4) Date: May 13, 2011

(87) PCT Pub. No.: WO2010/055166
PCT Pub. Date: May 20, 2010

(65) Prior Publication Data
US 2011/0220856 A1   Sep. 15, 2011

(30) Foreign Application Priority Data
Nov. 17, 2008  (EP) .................................. 08169285

(51) Int. Cl.
*C09K 21/02*  (2006.01)
*C01B 33/32*  (2006.01)

(52) U.S. Cl.
CPC ............ *C01B 33/325* (2013.01); *C09K 21/02* (2013.01)

(58) Field of Classification Search
CPC ................................ C09K 21/02; C01B 33/32
USPC ........................... 252/609; 423/326, 331, 332
See application file for complete search history.

(56) References Cited

U.S. PATENT DOCUMENTS

| | | |
|---|---|---|
| 4,304,052 A | 12/1981 | Nolte et al. |
| 4,654,268 A | 3/1987 | De Boel et al. |
| 4,676,998 A | 6/1987 | Nolte et al. |
| 2009/0148708 A1 | 6/2009 | Goelff |

FOREIGN PATENT DOCUMENTS

| | | |
|---|---|---|
| FR | 2 561 171 | 9/1985 |
| WO | 2006 092426 | 9/2006 |
| WO | 2007 060203 | 5/2007 |
| WO | 2007 144369 | 12/2007 |

OTHER PUBLICATIONS

Glover et al. "Evaporation of Difficult Products" Chemical Processing, 1997.*
International Search Report dated Sep. 30, 2010 in PCT/EP09/065273 filed Nov. 17, 2009.

* cited by examiner

*Primary Examiner* — Peter F Godenschwager
(74) *Attorney, Agent, or Firm* — Oblon, McClelland, Maier & Neustadt, L.L.P.

(57) ABSTRACT

The invention relates to the preparation of hydrated alkaline silicate compositions for making intumescent layers for fireproof glazing, said compositions being such that, when applied between glass sheets, they form a solid gel without drying, wherein the compositions are obtained from a stable and fluid solution subjected to partial dehydration at a limited temperature and under a reduced pressure for a duration shorter than that required for the mass curing of the final composition.

10 Claims, 2 Drawing Sheets

ALKALINE SILICATE DEHYDRATION

CROSS REFERENCE TO RELATED APPLICATION

This application is a 371 of PCT/EP2009/065273, filed on Nov. 17, 2009, and claims priority to European Patent Application No. 08169285.7, filed on Nov. 17, 2008.

The present invention relates to the treatment of alkaline silicates such as those used for the production of intumescent materials that form part of the composition of fire-resistant glazing units.

The widest spread fire-resistant glazing units are formed by glass sheets with layers of material arranged between them that have the property of forming refractory foams under the action of heat. When exposed to fire the water in these compositions evaporates to create a foam that is impervious to thermal radiation and is a poor conductor of heat. Because of this, the glass sheet or sheets located on the other side of this foam from the fire are not exposed to thermal shock and block the passage of fumes and flames.

The preparation of these intumescent materials in the production of these fire-resistant glazing units necessarily includes transformation of an alkaline silicate-based fluid composition into a solid state. This transformation is achieved either by drying a layer of the fluid composition applied to a glass sheet or by starting from a composition that expands spontaneously after being placed between the glass sheets.

In the first instance, with the absence of drying the starting composition firstly remains in fluid state. After drying the water content is reduced relatively significantly. The variation is usually more than 20%. Typically, starting from a silicate solution containing more than 55% by weight and even possibly more than 60% by weight of water, drying results in a dry layer with a water content reduced to less than 30%.

In the second instance, a typical composition contains in the order of 50% by weight at most of water. This content is established taking into account, on the one hand, the need to use compositions that have a distinct "refractory" character imparted by the molar ratio $SiO_2/M_2O$ (M being the alkaline metal) and that the stability of the composition requires a water content that is higher as this molar ratio increases.

In practice, in the case of molar ratios in the order of 3.5 to 5 the water content of the composition capable of expanding spontaneously has a water content in the order of 40 to 48% by weight. These characteristics are not found in commercially available industrial silicates. Therefore, a pre-treatment is necessary to obtain these compositions. There are two principal routes this treatment can follow, depending on whether industrial silicates are used or not. Intermediate solutions are also possible that correspond to the use of varied proportions of these industrial silicates as source of silica.

If industrial silicates are used, the water content is increased in order to also have a high molar ratio. As an indication, industrial silicates with a molar ratio of 3.3 have a water content in the order of 65%. With a molar ratio of 2 the water content is in the order of 45%. These values correspond to products that can be stored over very long periods without risk of forming a gel. Different proportions can be obtained that come close to conditions, in which the composition will become less stable. Thus, for molar ratios of 3.3, the composition can only contain in the order of 55% water. Nonetheless, such compositions also have too high a water content to spontaneously form gels.

In the second route, in order to form layers that are not dried the composition can be obtained by reacting silica in suspension and alkaline hydroxide. Their water content can thus be less significant, i.e. can correspond to the water content in the final layer. Consequently, these compositions must be used quickly.

The preparation can also be performed by combining the two routes indicated above. For example, a suspension of colloidal silica can be added to a solution of industrial silicates to increase the molar ratio of the silicate solution. The preparation can also be performed by combining a solution of industrial silicate with another that has a high molar ratio and is obtained by reacting hydroxide and silica.

A difficulty with all the cases considered is to form a composition that allows transformation from the fluid state to the solid state, meeting two requirements that are necessarily contradictory, i.e. a good stability in fluid state of the composition for as long as necessary and, once the composition has been put in place, the fastest possible hardening of this composition to shorten the process.

According to the invention this control of the change of state of the composition advantageously includes an adaptation of the water content a short time prior to use of the composition. The water content of the composition is adjusted according to the invention starting from a composition with a water content that is preferably a little higher than that sought for the intumescent layer of the glazing. Adjustment of the water content of the composition is achieved by dehydration conducted either in batches of composition or continuously.

Usually, dehydration is conducted a short time prior to use when the aim is to obtain the water content to be ultimately present in the final intumescent layer in such a manner that this composition is able to solidify without any operation other than acceleration of the hardening process by increasing the temperature.

At the stage reached by the dehydration, i.e. a hydration state close to the final composition, the treatment must be well controlled. In particular, the control of the water content of the entire composition as well as its temperature must be adjusted constantly to prevent the risk of premature hardening. For this reason, dehydration must be sufficiently gradual. Conversely, the demands of productivity or costs require that the duration of the operation should be restricted as far as possible.

In order to meet these different concerns, the dehydration is conducted according to the invention in an evaporation device at controlled temperature with constant agitation and under reduced pressure.

The formation of the solid gel from the dehydrated compositions according to the invention is greatly accelerated when the temperature is increased. For this reason, while the dehydration is also accelerated by increasing the temperature, the latter must still be controlled to avoid expansion before use of the composition and in particular in the equipment, in which the dehydration operation occurs.

In practice, this sensitivity of compositions prepared at any temperature elevation limits the temperature of the composition during dehydration. This is advantageously kept lower than or at most equal to 60° C. at every point of the composition. This applies for a composition forming a localised mass and also applies for a composition that can be spread in the form of a film of low thickness such as those that can be formed to improve heat exchanges through a wall coated with the composition to be dehydrated or also to maximise the evaporation surface.

The temperature of the composition preferably does not exceed 50° C. during the course of dehydration.

However, in practice, the composition can be brought to adequate temperatures because of the latent heat of vaporisation, even when conducting a heat exchange at a higher temperature. Hence, the temperature of the means used to conduct the evaporation can be 20° to 30° C. higher than the temperature of the composition itself.

The evaporation at such low temperatures would certainly take a very long time if conducted at ambient pressure. To increase the evaporation rate it is advantageous to operate at reduced pressure. The selected pressure preferably amounts to 1 to 100 hPa and advantageously 1 to 20 hPa.

Moreover, conducting the dehydration at reduced pressure assists degassing of the composition. This degassing is particularly useful when the preparation of the composition includes the use of colloidal silica. Silica particles, particularly because of their surface features, can tend to absorb gases that can ultimately be released to form undesirable bubbles. The use of evaporation at low pressure helps to eliminate these gases and reduces the risk of bubble formation.

Where the composition is intended to form a gel without drying after it has been applied into or onto the glazing units, the composition has a water content in the range of between 35 and 43% by weight after dehydration. The water content of the starting composition can be very variable.

To ensure that this operation is not extended needlessly, it is preferred that compositions with a water content not exceeding 60% and preferably not exceeding 55% by weight are used.

As it is preferable to limit dehydration, the water content before dehydration is preferably such that the variation in this content before and after dehydration is at most 20% and advantageously at most 14% by weight.

Moreover, to assist evaporation, the free surface is advantageously as extensive as possible. The dimensions of the equipment are necessarily limited and also the increase in exchange surface encompasses a distribution of the composition in the form of a film constantly renewed on a surface of the equipment used that is as broad as possible to assist the balance that occurs between the composition that is being dehydrated and the atmosphere in contact with this composition.

The constant renewal of the exchange surface also prevents an uneven distribution of the water content as a result of evaporation that necessarily affects a limited thickness of the composition at its interface.

The distribution of the composition in the continuous dehydration equipment is advantageously achieved in the form of a film with a thickness of not more than 3 mm and preferably not more than 2 mm.

The dehydration operation must be conducted in a precise manner. One way of determining the state of the composition during the course of this operation is to monitor the variation in the quantity of water evaporated and collected after condensation. This measurement can be performed equally on continuous operations and on operations in batches.

In operations conducted in batches, it is also possible to monitor the variation in weight of the composition during the course of dehydration.

In the preferred embodiments, the duration of the operation is an important detail for the economics of the process as well as for its technical operation. The control of the operation must prevent any risk of premature expansion. The operation, particularly at the end of dehydration, puts the composition into a state close to that which allows rapid spontaneous gelling. Therefore, it is not very desirable to maintain an extended treatment. Conversely, as indicated above, rapid treatment is achieved by an increase in temperature that also assists gelling. Therefore, a compromise must be made between two contradictory requirements.

Moreover, the cost of production is reduced since the dimensions of the installation can be decreased for the same capacity and this tends to benefit as short an operation as possible.

The duration of treatment is dependent on the initial water content and that of the final composition. The fact that the dehydration proceeds much more slowly as the water content decreases is also a consideration. Otherwise, the treatment period is not only proportional to the percentage of water eliminated.

As an indication, it is preferable to ensure that when dehydration is conducted continuously on thin films it is not extended beyond five minutes.

In the case of operations in batches, the duration is quite obviously dependent on the volume of the batch in question.

Advantageously, in particular for reasons of fire performance, molar ratios in the intumescent layers are preferably higher than 3. They are more frequently in the range of between 3 and 7 and more generally between 3 and 5. These ratios are also those of the composition on which the dehydration according to the invention is conducted.

In order to form intumescent layers without drying, the water contents of the compositions used advantageously lie between 25 and 45% and preferably between 30 and 40% at these molar ratios. To reach these values the initial compositions undergoing dehydration have a water content that is not higher than 55% and preferably not higher than 50%.

The dehydration is preferably conducted as the step that directly precedes use to form the intumescent layer. The latter can advantageously contain additional elements intended to improve the desired properties. Usually, intumescent layers include compounds such as polyalcohols, in particular glycerine or ethylene glycol, to improve various properties according to the overall composition.

An important role in the case of compositions with the highest water content is that of preventing degradation of the glazing when subjected to very low temperatures, in particular of less than −20° C. In the case of compositions that have a relatively low water content the presence of these polyalcohols improves the mechanical characteristics by a kind of plasticisation of the layer.

The polyalcohols in question are introduced in very variable proportions by weight, in particular for the reasons indicated above. This content preferably does not exceed 18% by weight of the intumescent layer, and preferably does not exceed 15%.

Other additives are traditionally used in intumescent layers such as aminated products that improve their stability over time and the reaction to fire, in particular with respect to their transparency. Traditional compounds are, for example, urea, TMAH (tetramethylammonium hydroxide). These compounds are preferably introduced into the intumescent layer in a quantity not exceeding 3% by weight.

Other constituents may also be introduced in the usual manner. These are in particular compounds such as silanes that also contribute to the structure of the layer by improving their mechanical characteristics. Products such as TEOS or MTEOS are known in these applications. Their content is also preferably at most equal to 5% by weight of the intumescent layer.

The invention is explained in more detail with reference to the sets of drawings, wherein.

Figure 5:
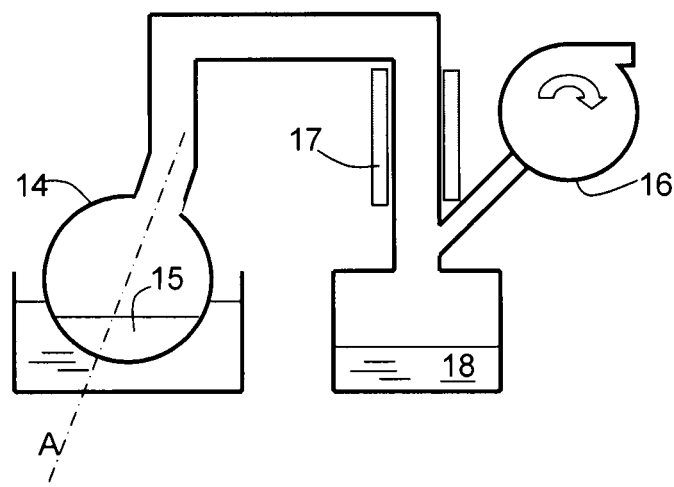
Figure 6:
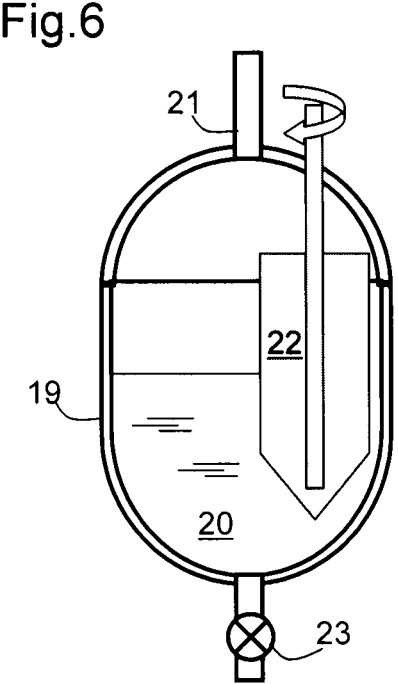

FIG. 5 schematically shows a non-continuous installation for the operation of the invention;

FIG. 6 shows another installation for non-continuous treatment.

Various types of equipment can be used to perform the dehydration. The choice of equipment is partly dependent on the volumes processed and the resulting need to operate in a continuous manner or not.

To ensure renewed distribution on a recipient wall, it is advantageous to ensure that a relative movement of the recipient wall with the composition is maintained to allow the formation of a film on the wall that is constantly reforming. The relative movement is advantageously in rotation, and for this purpose the surface of the device in which dehydration is conducted has a shape arranged along a rotation axis. This is preferably a principally cylindrical or frust-conical shape, but which can also comprise a spherical base.

Figure 1:
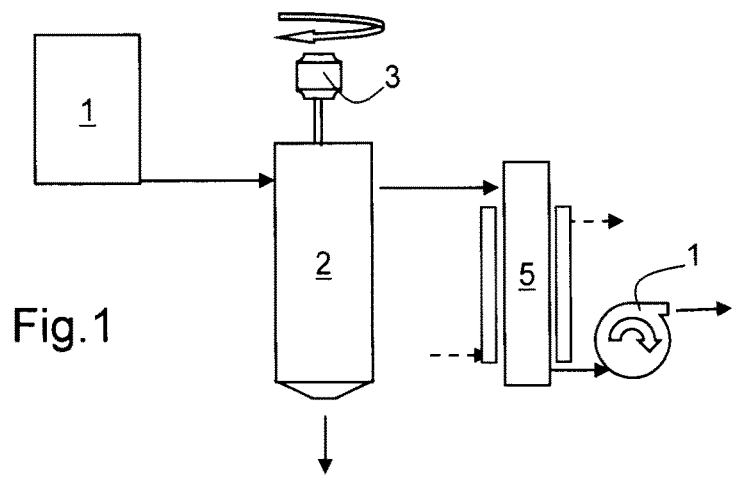
FIG. 1 is a diagram of the operation of a dehydration installation according to the invention.

FIG. 1, which shows the main elements of an installation for the dehydration according to the invention comprises a storage tank 1 for the composition that is to be subjected to dehydration. This composition is fed to an evaporator 2 by means (not shown). The supply of the evaporator is continuous.

The composition directed onto the walls of the evaporator 2 is moved along by a rotor driven by a motor 3.

The composition flows along the internal walls of the evaporator losing part of its water content. The dehydrated composition is recovered at a low section of the evaporator. It is then passed to its place of use. The subsequent use in fire-resistant glazing units is achieved within a relatively short time that takes into account the rapidity of its development into a gel.

The walls of the evaporator are heated in order to keep the composition at the temperatures chosen to assist dehydration. Advantageously, to accelerate this dehydration, the body of the evaporator is kept at partial pressure maintained by means of a pump system shown at 4.

Pumping also directs the dehydration water from the body of the evaporator 2 to the condenser 5. The condenser is cooled, for example, by circulating fluid coolant indicated by dotted arrows.

Figure 2:
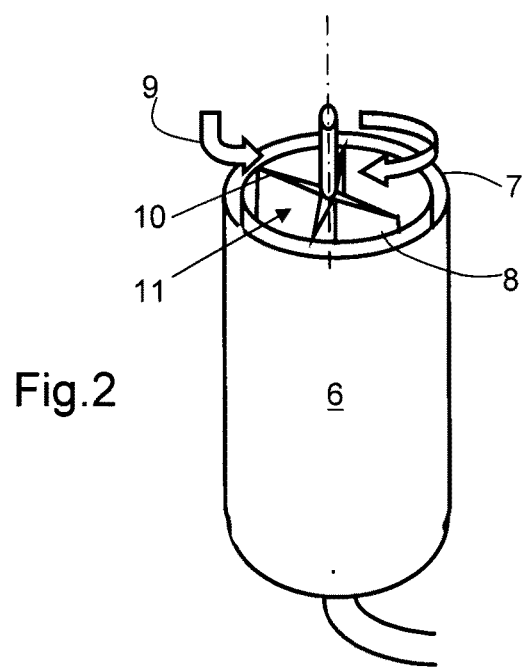
FIG. 2 is a perspective view of a section of an evaporator used according to the invention.
Figure 3:
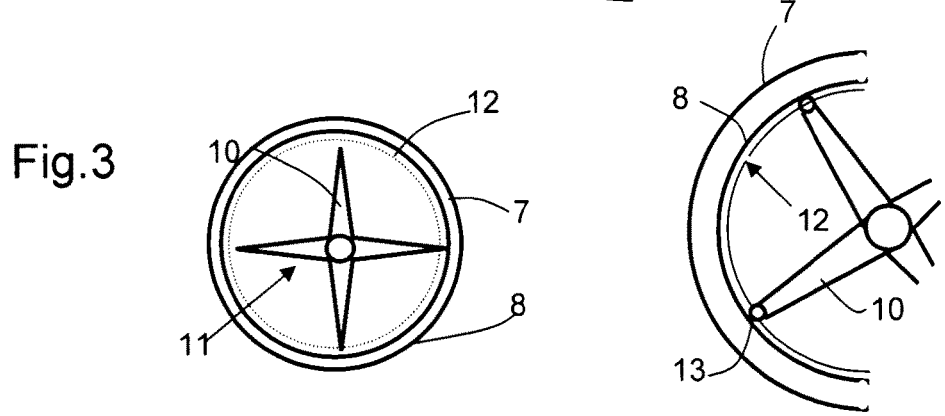
FIG. 3 is a plan view onto a section of the evaporator of FIG. 2.
Figure 4:
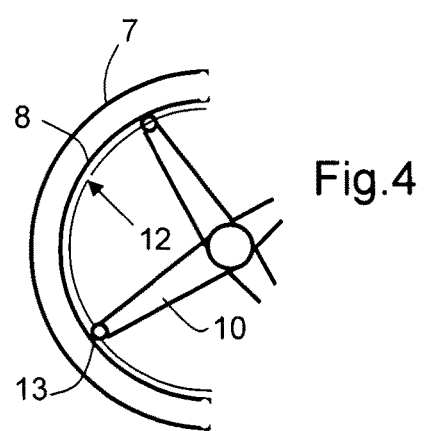
FIG. 4 is a view on an enlarged scale of a section of the wall of the evaporator.

FIGS. 2, 3 and 4 show in more detail a possible construction of the evaporator that benefits the rate of evaporation. Overall, this arrangement is intended to keep the dehydrated composition in the form of a relatively thin layer, which is constantly renewed to facilitate the presence on the surface of a composition that has a water content substantially the same as that of the whole of the composition. This arrangement therefore not only allows as rapid an evaporation as possible, but additionally prevents the risk of a water content being obtained that is so reduced that it could lead locally to the formation of the gel.

In its general form in FIGS. 2, 3 and 4, the evaporator 6 is formed by a closed cylindrical body with double walls 7 and 8, between which a fluid passes for the purpose of heating the inside wall and thus also the composition to be dehydrated in contact with it.

FIG. 2 shows the body open at its upper section to illustrate the arrangement of its main components.

In the embodiment shown, the composition is introduced into the upper section of the evaporator, as shown schematically by arrow 9, preferably in a tangential direction to the wall. From the introduction point the composition is moved along the hot wall 8 of the evaporator by gravity. It is spread over the wall by means of the blades 10 of a rotor 11 coaxial to the body 6.

The blades 10 of the rotor may be provided with means that enable the composition to be spread as a film 12 (shown in broken lines). These means can be flexible strips arranged at the end of the blades 10 that press the composition 12 onto the wall 8.

Another arrangement consists of replacing the blades 10 with a roller assembly 13 held at the end of support arms instead of the previous blades 10. The rollers are mounted so as to maintain a slight pressure on the walls over the entire height of the evaporator or more precisely on the composition covering the walls by rolling thereon.

Under the effect of gravity and the rotation of the blades, the composition advances in a helical type movement towards the lower section of the evaporator where it is recovered.

The progressive elimination of a fraction of the water contained in the composition can lead to a limited increase in viscosity. The pressure exerted by the ends of the blades 10 (rollers, flexible strips or similar means) allows the progression to be kept uniform.

The dimensions and operating conditions of the evaporator are adjusted to obtain the desired water content during an appropriate retention period in the evaporator.

The flow rate, temperature and pressure are some of the main factors that directly influence the elimination of the water. Each of these has some influence on the necessary retention time, within certain limits.

Another type of equipment is shown schematically in FIG. 5. The device in question operates on a non-continuous basis. It comprises a receptacle 14 containing the composition 15 to be dehydrated. The receptacle is mounted so that it can turn on its own axis A. The articulation that allows rotation at the neck of the receptacle while assuring a seal is not shown.

The receptacle 14 is maintained at temperature e.g. by immersing it in a hot bath 16 to provide a constant temperature.

On each turn, the rotation of the receptacle reforms a film of the composition on the walls to benefit both evaporation and uniformity.

As above, the pressure in the receptacle is reduced by pumping by the pump 16. At the same time, the water that has evaporated from the composition 15 is passed to the condensation device 17. Measurement of the condensed water 18 allows the water content of the composition 15 to be monitored.

Such a device is only effectively usable for restricted productions or for discrete uses. If a substantial production is required, the use of evaporators of the type shown in the previous figures is necessary Other non-continuous systems operate on similar principles, but have a fixed receptacle or reservoir, in which the composition is applied to the walls of this reservoir by means of one or more rotational elements dipping into the composition and causing it to be projected onto these walls. Various other components are also provided, i.e. an assembly that enables the composition to be heated, a suction system to evacuate the water vapour and maintain a reduced pressure in the reservoir and a condensation system.

FIG. 6 schematically shows an assembly of this type. The body with double walls 19 is heated by circulating a heat transfer fluid. The composition to be dehydrated 20 is introduced in one batch. The heated body is subjected to a partial vacuum by suction from a channel 21 for evacuating the water vapour. The pumping and condensation means are not shown. The heated composition 20 is agitated by a movement of rotation by means of blades 22, which assist in the application of the composition to the walls above the level of the composition when this is resting. This distribution increases the contact surface of the composition with the walls of the body and also benefits the conduction exchanges by constant renewal of this contact.

FIG. 6 shows a single agitator, but several agitators can be distributed inside the same body.

Dehydration is controlled as above, for example, by means of the recovered condensation water. At the end of the operation the composition is extracted via the valve 23 located at the base of the body 19.

A first evaporation test is conducted using a composition of hydrated potassium silicate having a water content of 51% by weight. The molar ratio of $SiO_2/K_2O$ is 4.6. The composition contains 4% by weight of ethylene glycol and 1% by weight of TMHA.

16.5 kg of the composition is placed in the rotary receptacle of FIG. 5. The receptacle is kept in a bath at 50° C. The temperature in the composition is maintained at about 25° C. because of the energy removed for evaporation. The receptacle is caused to rotate at 70 rpm.

The pressure at the pump is 8 hPa. The pressure in the receptacle is appreciably higher because of the abundant amount of water vapour discharging from it. It lies in the order of 22 hPa.

Condensation is achieved by passing the current of vapour into a condenser cooled by water to 5° C.

Evaporation is maintained until a composition with a water content of 38% by weight is obtained in the receptacle. The operation is completed after 105 minutes. The weight of the composition is not more than 12.96 kg. The water recovered in the condenser represents 3.2 kg. The water that has not been recovered represents about 4%. This uncondensed water is entrained with the pumped gases.

The composition obtained remains stable so long as it is not heated beyond 50° C. It can be kept at 4° C. for several days without gelling. When brought to ambient temperature (about 24° C.) its expansion is achieved in 8 hours.

This composition is advantageously used in fire-resistant glazing units formed by pouring the composition on a first glass sheet. After solidification of the silicate that can be accelerated by increasing the temperature, a second glass sheet is applied on the gel. The second sheet is secured on the silicate composition, for example, by passage through a furnace or by simple calendering in a manner known per se. The same composition can also fill a space confined between two sheets that has been sealed by a strip joining the two sheets at their periphery.

Therefore, the above test working from a stable silicate solution having a relatively high molar ratio of $SiO_2/K_2O$, allows a composition to be quickly obtained that no longer needs drying and that can be used in a glazing unit without any risk of premature gelling, since the available time is substantially adequate.

The conditions in which the dehydration is conducted can vary broadly. As an indication, working from the same composition as that in the test described above, but maintaining the temperature of the bath at 25° C. instead of 50° C. with the low pressure retained, the water content of 38% by weight is achieved after 150 minutes.

It is therefore possible to appreciably modify the conditions to which the composition is subjected. In the case of compositions with a higher tendency to gel rapidly, e.g. composition, which with the same water content would have a higher molar ratio of $SiO_2/K_2O$, e.g. 6 or more, they can thus be prevented from expanding, if necessary, during the course of the dehydration operation.

Still according to the invention and with the same molar ratio this time, dehydration in particularly low temperature conditions (possibly lower than ambient temperature) allows the dehydration to be conducted in a more intensive manner, if necessary.

A second evaporation test is conducted on the basis of a composition of hydrated potassium silicate having a water content of 51% by weight. The molar ratio of $SiO_2/K_2O$ is 4.6. The composition contains 3.21% by weight of ethylene glycol and 0.83% by weight of TMHA.

The recipient contains 3 kg of the composition which is maintained at 5° C. A calibrated pump moves the product at a flow rate of 1.8 kg/h and supplies a laboratory evaporator with scraped film. The oil that circulates in the double casing of the evaporator is heated to 80° C. As above, evaporation is sufficiently intense to maintain the temperature of the composition below 50° C. The evaporator is provided with an inside condenser, in which a fluid coolant kept at 2° C. flows. The evaporator is also connected to a pump which brings the pressure to 12 hPa.

The evaporator is fitted with a three-roller scraper system that rotates at a speed of 20 rpm. After about 30 minutes of routine operation 715 g of concentrated sol is collected in the lateral collector recipient and 189 g of water is collected in the condensate collection recipient. There was no measurable quantity of water in the water trap located downstream of the condenser. The condensates were analysed and their water concentration was higher than 99.5%.

Calculated by materials balance, the water concentration of the concentrated sol was brought to close to 38%. The concentration of ethylene glycol rose to 4% and that of TMAH to 1%.

The delivery was continuous. The average retention time of the product in the evaporator was measured. It lay in the range of between 1 and 2 minutes.

The composition obtained remains stable so long as it is not heated to beyond 50° C. It can be kept at 4° C. for several days without gelling. When brought to ambient temperature (about 24° C.) its expansion is achieved in about 8 hours.

The invention claimed is:
1. A method, comprising:
partially dehydrating a stable and fluid solution, which comprises an alkaline silicate-based fluid composition, at a temperature of not greater than 50° C. and at a pressure of from 1 to 100 hPa,
thereby preparing a final partially-hydrated alkaline silicate sol composition having a water content that lies in a range of between 35% and 43%,
wherein
said partially dehydrating is carried out prior to any deposition of said stable and fluid solution onto a glass layer to form a fire-resistant glazing unit,
the final partially-hydrated alkaline silicate sol composition is suitable to form an intumescent layer in said fire-resistant glazing unit, the alkaline silicate-based fluid composition comprises a $SiO_2/M_2O$ mixture where M represents an alkaline metal and a molar ratio of $SiO_2$ to $M_2O$ is from 3 to 5, and the partially dehydrating is carried out within an evaporator device that comprises the stable and fluid solution and an agitator, and the partially dehydrating is conducted by forming a film of the stable and fluid solution between the agitator and an internal surface of a wall of the evaporator device.

2. The method of claim 1, wherein a thickness of the film does not exceed 3 mm.

3. The method of claim 2, wherein formation of the film is continuous as a result of maintaining a relative movement of the stable and fluid solution and the wall of the device.

4. The method of claim 3, wherein the formation of the film on the wall of the device is assured by a rotational assembly of elements substantially parallel to the wall, with a shape arranged around a rotation axis.

5. The method of claim 1, further comprising:
monitoring the partially dehydrating by measuring a quantity of water evaporated and recovered by condensation.

6. The method of claim 1, wherein the stable and fluid solution has an initial water content of 60% at most.

7. The method of claim 1, wherein the pressure in the partially dehydrating ranges from 1 to 20 hPa.

8. The method of claim 1, wherein a thickness of the film does not exceed 2 mm.

9. The method of claim 1, wherein the stable and fluid solution has an initial water content of 55% at most.

10. The method of claim 1, wherein the alkaline silicate-based fluid composition comprises $SiO_2/K_2O$.

* * * * *